Dec. 23, 1969   B. P. DAWES   3,485,179
ROTARY PUMPS

Filed Dec. 20, 1967   6 Sheets-Sheet 1

FIG_1

FIG_5    FIG_4    FIG_6

INVENTOR.
BAILEY P. DAWES

BY
Boyken, Mohler, Foster & Schlemmer
ATTORNEYS

Dec. 23, 1969   B. P. DAWES   3,485,179
ROTARY PUMPS
Filed Dec. 20, 1967   6 Sheets-Sheet 3

INVENTOR.
BAILEY P. DAWES
BY
Boyken, Mohler, Foster & Schlemmer
ATTORNEYS

FIG_9

FIG_10

FIG_11

FIG_14

FIG_15

United States Patent Office 3,485,179
Patented Dec. 23, 1969

3,485,179
ROTARY PUMPS
Bailey P. Dawes, 366 Warec Way,
Los Altos, Calif. 94022
Filed Dec. 20, 1967, Ser. No. 692,227
Int. Cl. F04c 1/00, 3/00, 17/00
U.S. Cl. 103—136                                           6 Claims

ABSTRACT OF THE DISCLOSURE

A sliding vane type rotary pump of greatly reduced internal friction characteristics by the use of synthetics which may be carbon impregnated in seals and on engaging surfaces, which pump can be operated without lubricants for moving dry, lubricant free, fluids.

---

This invention relates to a rotary pump of the type having a generally cylindrical stator and a rotor eccentrically positioned within the stator, which rotor includes vanes projecting radially outwardly relative to the axis of rotation of said rotor into engagement with the inner surface of the stator and reciprocably carried by the rotor to maintain contact with said inner surface during rotation of said rotor about its axis.

This type of pump is old, and such pumps have been used as compressors or vacuum pumps according to the direction of rotation of the rotor relative to the stator.

One of the objects of the invention is the provision of a rotary pump of the above type in which frictional resistance between the vanes and the stator and between the vanes and the portion of the vanes mounting said vanes, is materially reduced over prior arrangements in pumps of this type eliminating the need for internal lubricants.

Another object of the invention is the provision of a substantially more efficient rotary pump than heretofore.

A still further object of the invention is the provision of a stator and rotor structure in a rotary pump of the type hereinbefore described, in which the vanes are guided and supported for reciprocable movement thereof radially of the axis of rotation of the rotor so that the outer edges of said vanes will follow a path about the axis of rotation of the rotor that is eccentric relative to a path that is concentric with said axis, and which vanes are positively constrained, independently of the influence of centrifugal force, to restrict movement of the outer edges of said vanes to a path that is substantially coincidental with the inner surface of the stator.

An added object of the invention is the provision of a stator and rotor structure in a rotary pump of the character hereinbefore described, in which the pump is operated as an air compressor, and in which atmospheric air to be compressed is moved in heat exchange relation to the stator at the point around the latter where compression of air and the heat of compression occurs, for cooling said stator at said point prior to the said cooling air being admitted to a compression area or chamber for being compressed.

Other objects and advantages will appear in the description and in the drawings.

It should be understood that the hereinafter described device can be used as either a vacuum or compression pump or as a rotary motor by making adjustments in the porting. The term "pump" will be used throughout the description and in the claims as a matter of convenience, but this is not intended to be a limitation on the kind of pump or to exclude the use of the device as a motor.

In detail, the pump illustrated comprises a stator, generally designated 1 (FIG. 2) and a rotor therein generally designated 2. Said stator comprises an inner cylindrical wall 3, the inner surface of which is in wiping or sealing relation to the outer edges of generally radially disposed vanes of the rotor, which rotor will be described more in detail later on.

Inner wall 3 is continuous and has imperforate sections 4, 5 (FIG. 2) at two opposite sides thereof that are integral with perforate sections 6, 7 (FIGS. 2, 3) disposed between the imperforate sections and at the two other opposite sides of the cylinder 3.

Figure 2:
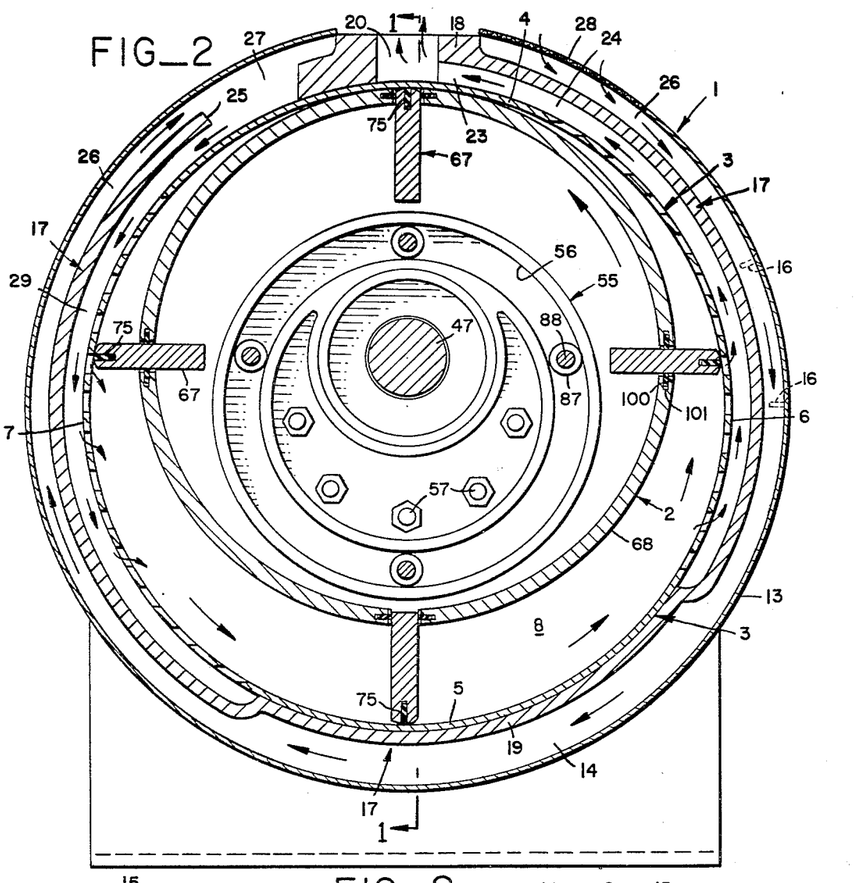
FIG. 2 is a cross sectional view taken substantially along line 2—2 of FIG. 1.
Figures 3, 7, 12:
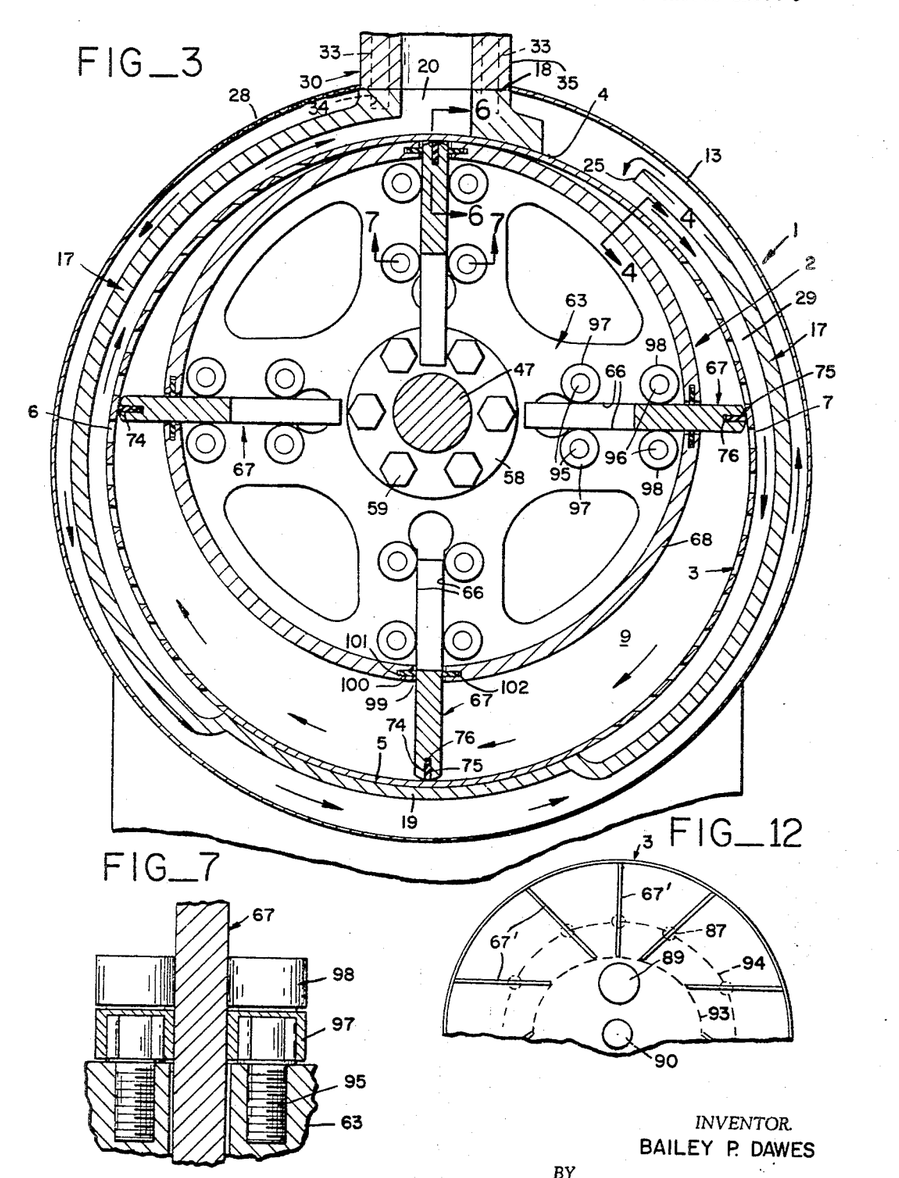
FIG. 3 is a cross sectional view taken substantially along line 3—3 of FIG. 1, which is the same as line 2—2 but looking in the opposite direction.
FIG. 7 is an enlarged, fragmentary cross sectional view at line 7—7 of FIG. 3.
FIG. 12 is a greatly exaggerated diagrammatic view showing the generally elliptical path of travel of the cam followers and cam track that control movement of the vanes in the rotor of the pump.

In the drawings the imperforate sections are respectively at the upper and lower sides of the cylinder, and assuming the pump is being used as a compressor, the perforate section 6 is at the right hand side as viewed in FIG. 2, or at the left hand side in FIG. 3.

Corresponding circular opposite end walls 8, 9 form the opposite ends of the stator, said end walls being coaxial, and each being formed with a rabbet on their oppositely facing sides around the outer periphery thereof to provide a radially outwardly facing shoulder 10 (FIG. 1) on which the marginal portion of the inner wall 3 is seated.

Figure 10:
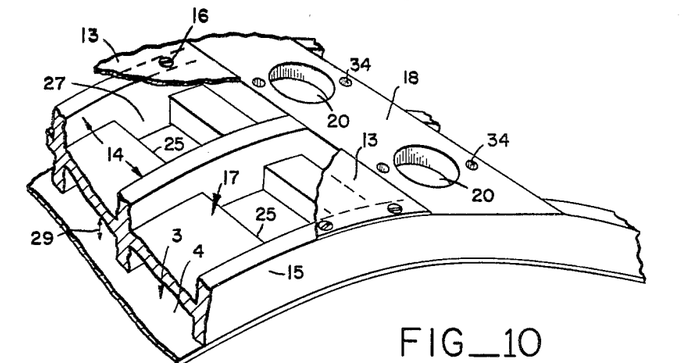
FIG. 10 is a fragmentary perspective view similar to that of FIG. 9 showing the structure of the stator at the exhaust portion of the pump but looking at said portion from the opposite side of the point of view of FIG. 9.
Figure 11:
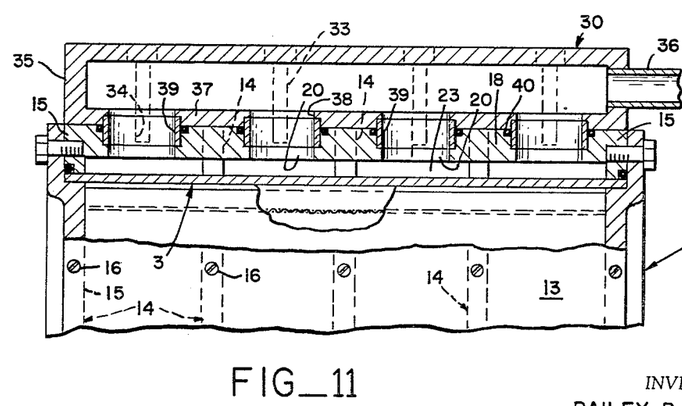
FIG. 11 is a cross sectional view, partly in elevation, and partly broken away, showing the structure at the manifold which is omitted from FIGS. 9, 10.

An outer cylindrical shell 13 is coaxial with and spaced outwardly of inner wall 3. This shell forms the outer housing of the pump, and its end marginal portions extend over and are secured to the outer surfaces of a row of coaxial, spaced, circular ribs generally designated 14, that are coaxial with the inner wall 3 and the housing or outer shell 13, by screws 16 or in any other suitable manner (FIGS. 2, 10, 11). The end ribs of the row may be designated 15 to distinguish from the others (FIGS. 1, 8–11).

These ribs are integral with a generally cylindrical intermediate wall 17 of the stator (FIGS. 2, 3, 9 10).

Ribs 14 are interrupted at the upper side of the row by an axially extending body portion 18 (FIGS. 2, 9–11) extending transversely of the ribs and with which said ribs are integral. The upper surface of body portion 18 is flat for securement of a manifold thereto, as will later be explained, and the outer surfaces of the ribs are flush with said upper surface where the ribs join said body. The outer shell 13, however, extends to said body portion, and not across it. The radially inwardly facing surface of said body portion is in tight relation to the outer surface of the inner cylinder 3.

Figure 1:
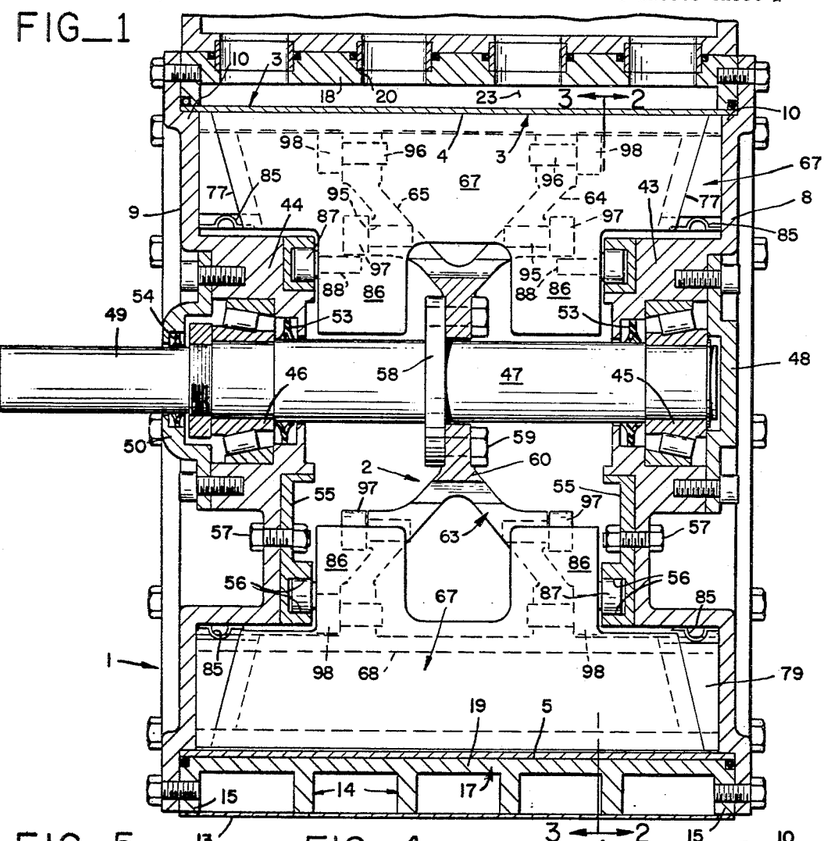
FIG. 1 is a vertical cross sectional view taken generally along line 1—1 of FIG. 2.

Said intermediate wall 17 is supported by the ribs 14 substantially equally spaced between the outer shell 13 and the inner wall 3 over the perforate portions 6, 7 of aid inner wall, and where portion 5 of wall 3 commences, and for the circumferentially extending length of said portion, the intermediate wall 17 is tightly against the outer surface of said portion, as indicated at 19 (FIGS. 1–3.)

The body portion 18 is formed with a row of openings 20 (FIGS. 2, 9–11) that open upwardly, and that are closed at the lower ends by the portion of the inner cylinder 3 that extends thereacross. These openings are disposed in body 18 to be in the spaces between imaginary continuations of the adjacent pair of ribs 14.

The intermediate wall 17 integrally joins the righthand side of body 18 as viewed in FIG. 2, or the left-hand side as viewed in FIG. 3, and the lower portion of said body 18 below wall 17 is omitted, as at 23 (FIGS. 1, 2, 11) so as to provide for admission of air to the lower ends of openings from the spaces 24 that are between the adjacent pairs of ribs 14 and between wall 17 and the inner wall 3 (FIGS. 2, 9).

The end of wall 17 that is at the left side of body 18 as viewed in FIG. 2, or the right side as viewed in FIG. 3, terminates at 25 short of the body 18.

By the foregoing structure air passageways or ducts 26 extend between the adjacent pairs of ribs 14, and between wall 17 and the outer shell 13, from body 18 to the spaces 27 between the ends 25 of wall 17 and body 18. The outer shell 13 is imperforate, except along the right side of body 18 as viewed in FIG. 2, and the portion 28 of the shell 13 is a screen to pass atmospheric air to passageway 24. Air admitted through screen 28 will pass completely around the stator to spaces 27.

At the side of the stator opposite to the spaces 24 that are over the perforate section 6 of the inner cylinder 3 are similar spaces 29 over the perforate section 7 of the inner cylinder (FIGS. 2, 3, 10). These spaces end where the portion 19 of the intermediate wall 17 is against the imperforate section 5 of the inner wall 3. Spaces 29 communicate with space 27, and consequently with the open ends of passageways 26 that are at the left side of body 18, as viewed in FIG. 2.

A manifold 30 is adapted to be bolted by bolts 33 (FIGS. 3, 11) onto the flat upper surface of the body portion 18. This manifold is hollow and horizontally elongated to extend the length of said body portion, the latter being formed with openings 34 for the lower ends of said bolts and the latter extending through sidewalls 35 of the manifold. Any desired number of take-offs from the manifold may be provided, such as a pipe 36 (FIG. 11) connected with one end wall of the manifold.

The bottom wall 37 of the manifold is formed with openings 38 (FIG. 11) that are in register with openings 20 in the body member 18, and the walls of openings 20, 38 may be counterbored to receive a tubular sleeve 39 in each registering pair of openings, which sleeve extends across the juncture between the body portion 18 and the manifold. Openings 20 may be further counterbored for O-rings 40, one of the latter being around each sleeve to prevent leakage of air.

End walls 8, 9 are formed with portions 43, 44 that project inwardly into the stator, said portions being spaced from the outer peripheries of said end walls, and said portions are formed with coaxial openings in which bearings 45, 46 are secured. Said bearings are eccentrically positioned relative to the central axis of the rotor in a direction toward the upper side of the stator as viewed in FIGS. 1–3. Shaft 47 is rotatably supported in bearings 45, 46 (FIG. 1) and a cap 48 bolted to end wall 8 extends across one end of said shaft, while the opposite end portion 49 of said shaft extends through the central opening in a similar cap 50 and projects outwardly of end wall 9 for connection with a motor or any other suitable source of power for rotating said shaft. The openings for shaft 47 in the inwardly projecting portions 43, 44 may be counterbored adjacent to bearings 45, 46 for oil seals 53 and the opening in cap 50 is counterbored for a similar oil seal 54.

Secured in similarly recessed portions on the oppositely facing sides of the portions 43, 44 of walls 8, 9 are corresponding members 55 having corresponding oppositely opening channels thereon defining a pair of cam tracks 56 (FIGS. 1, 2) for receiving therein cam followers in the form of rollers, as will be descrbed later.

Bolts 57 secure members 55 to end walls 8, 9 (FIGS. 1, 2). Cam tracks 56 are coaxial with the central axis of the inner cylindrical wall 3 being substantially circular, although, as will be considered more in detail later on, they define slightly elliptical paths for cam followers with their major axes horizontal as viewed in FIG. 2.

At a point spaced between numbers 55 the shaft 47 is formed with a radially outwardly projecting circular flange 58. Bolted against one side of flange 58 by bolts 59 (FIGS. 1, 3) is the central portion 60 of a circular member 63 that is formed with generally frusto-conical walls 64, 65 (FIG. 1) having their smaller diameter ends integral with the outer periphery of the central portion 60. Shaft 47 extends through portion 60 and is coaxial therewith.

In the illustration, the frusto-conical walls 64, 65 are respectively radially slotted at 66 (FIG. 3) to points adjacent to the portion 60 and vanes generally designated 67 are reciprocable radially of the frusto-conical members.

Part of the frusto-conical walls 64, 65 and concentric with the central axis thereof is the cylinder 68 of the rotor. This cylinder is around the circular outer peripheral edges of walls 64, 65, extending thereacross and integral therewith, and it is slotted axially thereof for passing the vanes 67.

The circular end edges of the cylinder 68 are grooved circumferentially thereof at 69 (FIG. 4) for receiving sealing strips 70 therein. These strips may be of any suitable material, such as "Teflon" and which strips are yieldably held against the end walls 8, 9 by wave springs 73 disposed between the bottoms of the grooves 69 and the strips 70.

Figure 6:
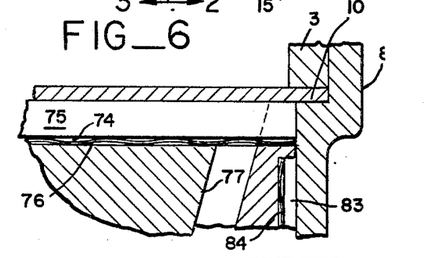
FIG. 6 is an enlarged fragmentary sectional view taken through one corner of a vane of the rotor showing the seal between the element of FIG. 5 and the stator at one end wall of the latter.
Figure 8:
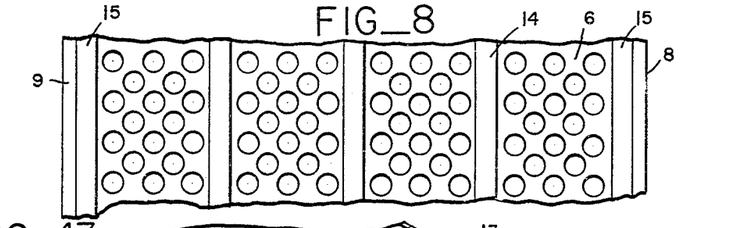
FIG. 8 is a fragmentary plan view of a portion of the stator at the air intake side.
Figure 9:
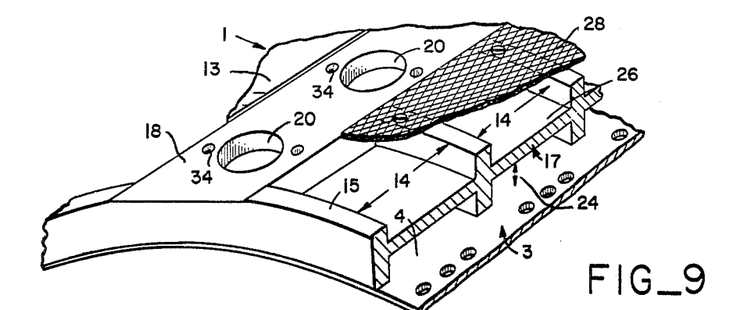
FIG. 9 is a fragmentary perspective view, partly in cross section, showing structure of the stator at the exhaust portion of the pump.

Each vane 67 has an elongated, straight outer edge extending axially of the cylinder 68, which edge is convexly rounded transversely thereof and is centrally grooved at 74 for a sealing strip 75 (FIGS. 2, 3) that substantially corresponds to strips 70, being of the same material, but convexly curved transversely thereof where strip 75 engages the cylindrical inner surface of the inner cylinder 3 of the stator. Wave spring 76 respectively disposed between the sealing strips 75 and the bottom of each groove 74 yieldably hold the strips against cylinder 3 (FIG. 6).

Figures 4, 5:
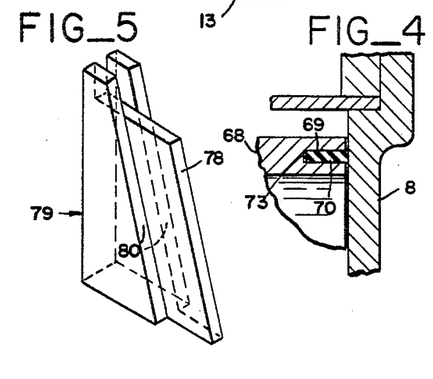
FIG. 4 is a fragmentary, enlarged, cross sectional view at line 4—4 of FIG. 3, showing a sealing structure between the end of the rotor and an end wall of the stator.
FIG. 5 is an enlarged isometric view of one of the end portions of each vane on the rotor separate from the main vane.

The ends of each vane 67 are spaced from the end walls 8, 9 and terminate in edges 77 (FIG. 1) extending divergently in an outward direction relative to shaft 47. These end edges are each grooved longitudinally thereof to receive the tongue 78 of an end piece 79 (FIG. 5). When the tongue on each end piece is in the groove in the end of a vane the divergently extending end edge of the vane at each side of the slot will engage similarly extending shoulders 80 (FIG. 5) on the end piece, while the outer edge of each end piece that is opposite to said shoulders is at a right angle to the length of each vane, and is formed with a groove for a sealing strip 83 (FIG. 6) that is yieldably urged against the end wall 8 or 9 that is adjacent thereto by a wave spring 84.

These sealing strips 75, 83 are also preferably of the plastic material called "Teflon" or similar material.

The divergently outwardly extending edges of the ends of the vanes coact with the end pieces to maintain a sealing contact between the sealing strips 83 and the end walls of the stator under the influence of centrifugal force when the shaft 47 is rotated for revolving the vanes, but where the rate of rotation is insufficient to maintain the seal, a leaf spring 85 secured at one end in each end of each vane below the radially inner edge of each end piece (FIG. 1) will yieldably hold the end pieces against radially inward movement under the influence of gravity.

The opposite end portions of each blade are disposed between the axially inwardly projecting portions 43, 44 of the ends 8, 9 and the inner cylinder 3 and in combination with the end pieces 79 they extend substantially to the flat opposed surfaces of said end walls that are outwardly of said portions 43, 44.

The central portions of the vanes 67 that are between said portions 44 are each formed with a pair of spaced radially inwardly extending projections 86. The opposite sides of these projections are coplanar with the opposite sides of the remainder of the vanes that are outwardly thereof, and the space between the projections 86 enables the vanes to move radially inwardly approximately to shaft 47 without interference with flange 58, while the oppositely outwardly facing edges of the pair of projections on each vane are closely adjacent, and extend across, cam tracks 56.

Each projection 86 on each vane carries a cam follower 87 in the form of a rotatable roller in the present form of this invention, the shaft 88 of which is secured within each projection 86 (FIGS. 1, 2). These cam followers control the movement of each vane as the rotor is revolved, and said cam tracks 56 are slightly elliptical with the major axis perpendicular to a common plane bisecting the axis of the stator and the rotor. This variation from a circle may be only approximately .55" at each side in the direction of said major axis, where the axis of the rotor is offset approximately .8" from the axis of the inner cylinder 3, hence is not perceptable except in the exaggerated drawing (FIG. 12). The degree of variation of the cam track from a circle depends on the size of the pump and the amount by which the axis of the rotor is offset from the axis of the inner cylinder.

In FIG. 12, it is seen that the vanes 67 are radial relative to axis 89 of the shaft 47, while their outer edges follow the inner cylindrical surface of cylinder 3, the axis 90 of which is offset relative to axis 89. Thus the inner edges of the vanes 67, and the positions of cam followers 87 do not follow paths that are coaxial with the cylinder 3, but instead they follow the elliptical paths 93, 94 indicated in broken lines in FIG. 12. The cam tracks 56 are elliptical so as to eliminate substantial frictional resistance between the vanes and the inner cylinder and yet maintain a uniform accurate and effective seal between said sealing strips 75 and the cylinder 3.

While FIG. 12 is exaggerated, it does illustrate why cam tracks 56 must be elliptical in order to make the outer edges of vanes 67 follow the circular path of the inner surface of cylinder 3. Vane 67' in FIG. 12 is in a plane normal to and passing through both axes 89 and 90. A vane disposed 180° from vane 67' would likewise be in a plane passing through both axes 89 and 90. However, in no other position is a vane in a plane normal to axis 90 since such vanes are always in planes normal to axis 89.

When vane 67' is normal to both axes 89, 90 it is also normal to a tangent to the inner surface of cylinder 3 at the point of engagement by the edge seal of vane 67'. It can be seen that in no other positions are vanes 67 normal to corresponding tangents.

When so positioned the length of said vanes is of maximum effect between cam tracks 56 and said inner surface. In any other positions the length of the vanes is diminished by the angle of projection between the vane and a tangent to said inner surface at the outer end of said vanes. Thus, the vanes must be thrust outwardly at all points other than normal positions in order to make up for the diminished length. The elliptical cam track 56 serves this function.

The points of greatest deviation from a circular cam track, as seen in FIG. 12, are those in a horizontal plane passing through axis 89 since these are the positions in which the length of vanes 67 is most diminished by the angle of projection between such vanes and tangents to said inner surface.

This elliptical cam track is a significant improvement over the prior art in that prior devices have incorporated vanes short enough to contact the inner surface of a cylinder such as 3 at the closest point, leaving sealing contact at other points to radial movement of a spring urged edge seal such as 75. In such devices the vane edge seals were continually reciprocating with rotation of the rotor increasing heat, friction and wear and reducing the efficiency of the machine.

While such reciprocating seals could move outwardly with relative ease under the influence or springs such as 76 plus centrifugal force, inward movement at closer points was against these forces and encouraged binding.

With applicants elliptical cam track 56, edge seals 75 maintain a constant relation to vanes 67 and said vanes are actively moved radially inwardly and outwardly by interaction between said cam track and said vanes as previously described.

Supported on pairs of inner shafts 95, and pairs of outer shafts 96 are rollers 97, 98, the said pairs of shafts 95 (FIG. 3) being secured on each of the frusto-conical portions 64, 65 of the circular member 63 in positions projecting oppositely outwardly of the pair of frusto-conical portions 64, 65 and axially of the axis of said member 63. These shafts are positioned at opposite sides of each vane 67 so that the projecting portions 86 of the vanes will be between the rollers 97 on said shafts.

The shafts 96 are radially outwardly of shafts 95 and are also at opposite sides of each vane so that the rollers 98 thereon will also engage the opposite sides of each vane outwardly of rollers 97. Said shafts 96 are also carried by the frusto-conical members 64, 65 and the rollers are preferably offset axially outwardly of the pair of rollers 97 so they will not engage the vanes at the same places during reciprocation of the vanes.

As has been described, the vanes 67 extend through slots in the cylindrical rotor 68, which slots are designated 99 (FIG. 3) and these slots are sufficiently wide to preclude engagement between the edges of the slots and the sides of the vanes. The sides of said slots are grooved for sealing strips 100 and for wave springs 102 between the strips and the bottoms of the recesses to maintain yieldable engagement between said strips and the vanes. These strips are also preferably of "Teflon" or the like.

The pairs of rollers 97, 98 maintain the vanes in radially extending positions at all times relative to the shaft 47, thus reducing frictional resistance during their reciprocable movement to a minimum.

Figure 13:
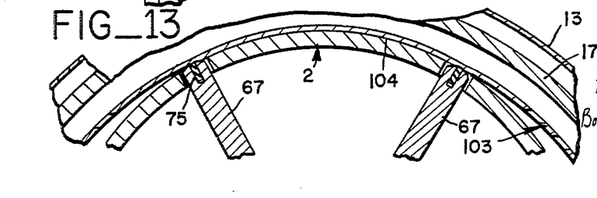
FIG. 13 is a fragmentary view of a modification of a portion of the stator at the discharge point.

In FIG. 13 a modification of the inner cylinder 3 of FIG. 2 is shown. This structure is particularly efficient where the pump is used for producing a high vacuum.

The cylinder 103 is the same as in FIG. 2, except that the imperforate portion 104 thereof at the top between the perforated portion 6 and the perforated portion 7 follows the curvature of the rotor cylinder 2 and is against the latter for a distance at least equal to the distance between each adjacent pair of vanes 67, and the cam track is correspondingly curved to guide and control movement of the vanes along the arcuate portion 104. By this arrangement seepage of air past the portion 104 is substantially prevented.

In operation as a compressor, referring to FIG. 2, the rotor would be driven counterclockwise and the air entering through screen 28 is conducted through passageway 26 substantially completely around the intermediate generally cylindrical wall 17, and then through the perforated portion 7 into the progressively expanding space between adjacent pairs of vanes 67.

The air is then carried around the rotor to the side opposite to the perforated portion 7 where it is compressed and is discharged into passageway 24 and manifold 30 and from thence to a storage tank for use.

The cool air entering passageway 24 is in direct heat exchange relation to the intermediate wall 19 that, in turn, is adapted to receive heat of conduction through ribs 14 that are in direct contact with the inner wall 3 at the portion of the latter where compression of air, and consequent heating thereof occurs, hence a cooling of the wall 3 and the compressed air will occur.

Upon reverse rotation of the rotor, or a clockwise rotation, as viewed in FIG. 2, the pump will function to create a vacuum, since no air is admitted through the perforations in the perforated portion 6 into the progressively expanding spaces between adjacent pairs of vanes and whatever air is between the adjacent vanes passing the perforated portion 7 is discharged into the atmosphere.

Figure 14:
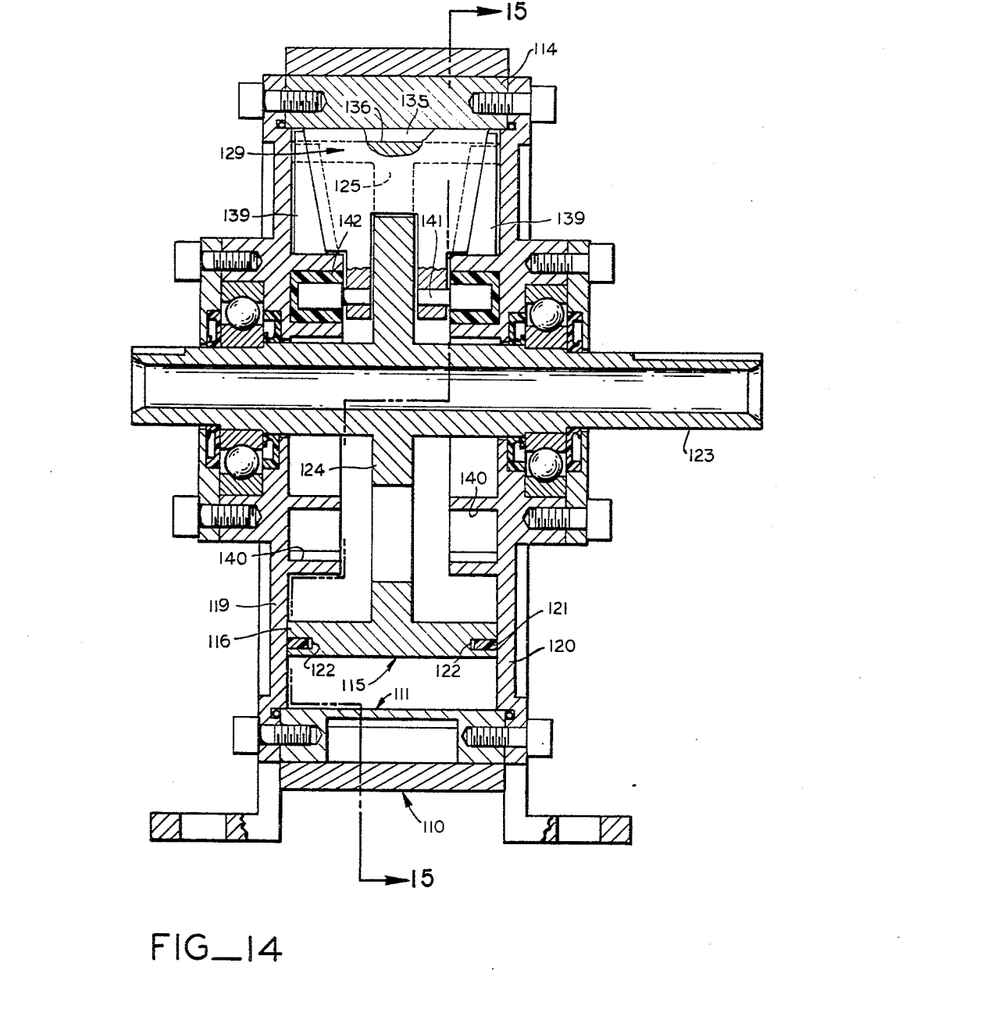
FIG. 14 is a cross sectional view of a modified form of the present invention as seen substantially along line 14—14 of FIG. 15.
Figure 15:
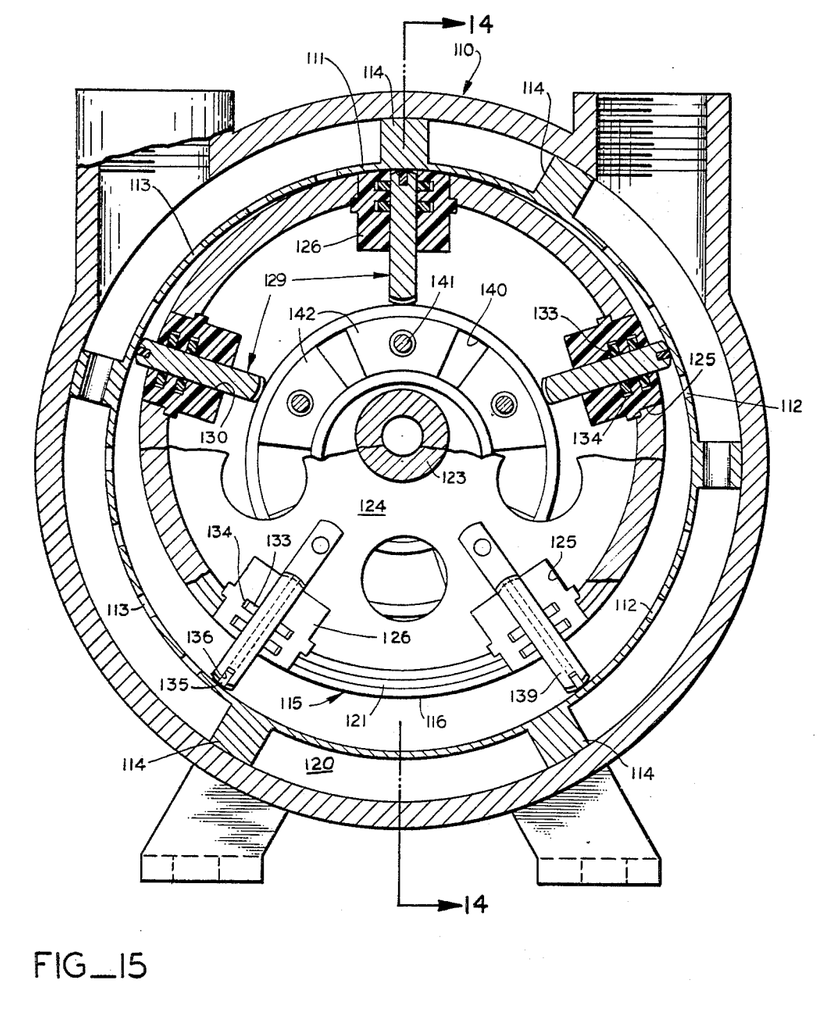
FIG. 15 is a cross sectional view of the modification of FIG. 14 as seen substantially along line 15—15 of FIG. 14.

FIGS. 14 and 15 include further modifications of the present invention, however the operation is substantially the same as that previously described.

The modification, which may be a vacuum pump, includes an outer circular housing 110 concentrically disposed around and spaced from an inner cylindrical wall 111 of the stator. The spacing between housing 110 and inner wall 111 forms the intake and exhaust manifolds of the modified rotary pump. Assuming clockwise operation, a plurality of apertures 112 in inner cylindrical wall 111 admit air into the expansion side of the pump through two communicating chambers of the manifold. Similar apertures 113 on the compression side of the pump relieve air from the pump through other communicating chambers in the manifold.

The intake and exhaust chambers of the manifold are prevented from communicating with each other by means of solid spacers 114 extending between housing 110 and inner wall 111.

Disposed within but eccentric to cylindrical inner wall 111 is the vane carrying rotor generally designated 115. Rotor 115 consists of an outer cylinder member 116, the opposite edges of which extend to sliding engagement with the inner surfaces of end walls 119, 120 of outer housing 110. The engagement of the edges of the cylinder 116 with the inner surfaces of such end walls is made substantially fluid tight by recessed seals 121 urged outwardly of said edges and into engagement with said inner surfaces by wave springs 122.

Cylinder 116 is connected for rotation to a drive shaft 123 by a web member 124 extending therebetween centrally of the opposite edges of said cylinder. Cylinder 116 and web 124 may be integrally formed with shaft 123 or they may be secured thereto in a desirable manner.

Shaft 123 extends through end walls 119, 120 and may be mounted therein by bearings and said shaft may be sealed at said end walls against the passage of any fluids from within the pump and from any contaminants from without.

A plurality of axial slots 125 are formed in cylinder 116 corresponding to the number of vanes in a given rotor, which slots extend radially into web 124. Closely received in slots 125 are mounting guides 126, one on each side of each chamber forming vanes 129. Guides 126 may be made of a plastic such as "Teflon" and correspond very generally to the sets of rollers 97, 98 of the form of the invention disclosed in FIG. 3.

Vanes 129 are intended to reciprocate radially of rotor 115 in spaces 130 between mounting guides 126.

Seepage of fluid through guides 126 past vanes 129 is prevented by seals 133 disposed within said guides and forced into sliding engagement with the sides of vanes 129 by wave springs 134.

The outer edges of veins 129 are sealed against the inner surface of cylinder 111 in much the same manner as described in the previous form of the invention. Seals 135 are received in slots 136 in the outer edge of such vanes 129 at the point of engagement with said inner surface. Seals 135 extend between end walls 119 and 120 of the housing. Sealing blocks 139, similar to sealing blocks 79, seal the opposite edges of vanes 129 against the inner surfaces of end walls 119 and 120. Sealing blocks 139 are angularly mounted in slots in the opposite end edges of vanes 129 in the same manner in which blocks 79 (FIG. 5) are mounted in similar slots in the end edges of vanes 67 (FIG. 1). Assuming the device of FIGS. 14 and 15 is intended for high speed operation, it can be seen that there are no wave springs needed to urge seals 135 and sealing blocks 139 outwardly. The centrifugal force of high speed rotation of rotor 115 will force sealing blocks 139 and therefore seals 135 angularly outwardly into engagement with the inner surfaces of end walls 119, 120 and the inner surfaces of cylindrical walls 111 respectively.

Vanes 129 are reciprocated inwardly and outwardly of rotor 115 by means of cam followers engaging a cam track in much the same manner in which followers 87 engage cam track 56 (FIG. 1). As seen in FIGS. 14 and 15, corresponding inwardly opening cam tracks 140 are formed on end walls 119, 120. These cam tracks 140 vary from being perfectly circular for the same reasons that the cam track is slightly elliptical in the previously described form of the invention in conjunction with FIG. 12.

Securely received in the inner ends of each vane 129 are oppositely outwardly projecting pins 141. These pins extend into cam tracks 140 and are therein rotatably received in cam follower shoes 142 having inwardly converging sides and arcuate inner and outer surfaces. This structure for reciprocating vanes 129 is quite similar to that previously described; however, it will be noted that shoes 142, which may be made of a relatively friction free plastic such as "Teflon," are substituted for the cam follower rollers 87.

At high speed operations the stability of shoes 142 has been found to be a substantial advantage over rollers 87. It will be recalled that vanes 129 are not always perpendicular to the axis of inner cylinder wall 111. Thus, as they rotate they tend to have a rocking motion as illustrated in FIG. 12. Shoes 142, with greater bearing surfaces on the inner and outer runs of cam tracks 140, allow for more accurate and stable reciprocation of vanes 129 at high speed rotation as would be the case with a vacuum pump.

The substitution of mounting guides 126 for sets of rollers 97 and 98, the elimination of springs tending to urge the seals 135 and sealing blocks 139 outwardly, and the increased efficiently of substituting cam follower shoes 142 for cam follower rollers 87 represent substantial improvement in the form of the invention described in FIGS. 14 and 15.

It should be understood that the above detailed description discloses the preferred forms of the present invention but it is not intended to be limiting, as other forms and modifications may occur to those skilled in the art which do not depart from the spirit of this invention and which come within the scope of the appended claims.

I claim:
1. A rotary pump comprising:
(a) a stator including an inner cylinder having a radially inwardly facing cylindrical surface, and opposed end walls closing the ends of said cylinder;
(b) a rotor within said cylinder;
(c) said rotor including a central shaft rotatably supported on said end walls about an axis parallel with but eccentrically disposed relative to the central axis of said cylinder whereby one side of said cylinder is closer to said shaft than the opposite side, and a plurality of blade-like vanes having end edges substantially in engagement with the oppposedly facing surfaces of said end walls and outer edges in slidable engagement with the inner surface of said cylinder;
(d) means connecting said vanes with said shaft for revolvable movement around the axis of said shaft and for radial reciprocable movement relative to said axis upon rotation of said shaft, said means including a cylindrical member coaxial with the axis of said shaft one side of which is in slidable engagement with said one side of said cylinder, and said member being formed with slots through which said vanes are reciprocable;
(e) an outer wall over and spaced outwardly of said cylinder including an elongated body portion extending axially of said cylinder and integral therewith in sealing engagement with the outer surface of said cylinder along a line extending longitudinally from end to end of the latter at said one side of said cylinder, said outer wall including a pair of sections of cylindrical contour extending oppositely away from said body section around said cylinder to points adjacent to but spaced from an imaginary line parallel with said member and along the side of said cylinder opposite to said one side thereby providing a pair of passageways for air extending away from said body portion between said sections and said cylinder, and an opening formed in one section of said pair along one side of said body portion, and a passageway for air extending through said body portion connecting at one end with the passageway for air at the opposite side of said body with the section of said outer wall at said last mentioned opposite side of said body being imperforatae and extending to said body portion;
(f) openings formed in the portion of said cylinder that is radially inwardly of said imperforate section of said outer wall, and openings formed in said cylinder that is radially inwardly of the section that is at the side of said body portion opposite to said imperforate section;
(g) the outer shell spaced outwardly of said cylinder and said outer wall extending to opposite sides of said body portion providing an outer air passageway substantially around said outer wall, and openings for air formed in said outer shell radially outwardly of said imperforate portion of said outer wall for admitting air for passage around said outer wall to the opening in the outer wall section that is at the side of said body portion opposite to said imperforate section, whereby atmospheric air in said outer passageway will be in heat exchange relation to said outer wall section for substantially their entire circumferentially extending lengths;
(h) said passageway in said body portion being adapted to connect with a vacuum or pressure tank according to the direction of rotation of said rotor.
2. In a rotary pump as defined in claim 1:
(i) said outer wall including a plurality of circularly extending ribs extending around said cylinder from one side of said body portion to the outer, said ribs being axially spaced apart relative to the axis of said cylinder spacing said outer shell from said cylinder and supporting said outer shell, and means securing said outer shell to said ribs.
3. A rotary pump comprising:
(a) a stator having a wall with a substantially cylindrical inner surface and opposed end walls closing the ends of said stator;
(b) a rotor within said stator including a central shaft rotatably supported on said end walls in a position eccentrically disposed relative to said cylindrical inner surface, and a plurality of blade-like vanes having end edges substantially in engagement with the oppposedly facing surfaces of said end walls and having outer edges substantially in engagement with the cylindrical inner surface of said stator;
(c) means for connecting said vanes with said shaft for movement around the axis of said shaft upon rotation of the latter, and for radial oscillatory movement relative to the axis of said shaft during said rotation;
(d) means respectively on said vanes and on said end walls for holding said outer edges of said vanes in slidable engagement with said inner cylindrical surface of said stator, independently of the influence of centrifuged force, upon said rotation of said shaft and revolution of said vanes about the axis of said shaft;
(e) said means connecting said vanes with said shaft including a radially slotted member rigid on said shaft extending outwardly therefrom and receiving each of said vanes, and mounting means on said member at opposite sides of each of said vanes in engagement with and supporting said vanes for said radial movement thereof during said rotation of said shaft;
(f) said mounting means including rollers being in pairs with the rollers of each pair spaced radially of said axis and with one of the rollers of each pair offset axially relative to said shaft for engaging opposite sides of said vanes along different radially extending lines.
4. A rotary pump comprising:
(a) a stator having a wall with a substantially cylindrical inner surface and opposed end walls closing the ends of said stator;
(b) a rotor within said stator including a central shaft rotatably supported on said end walls in a position eccentrically disposed relative to said cylindrical inner surface, and a plurality of blade-like vanes having end edges substantially in engagement with the oppposedly facing surfaces of said end walls and having outer edges substantially in engagement with the cylindrical inner surface of said stator;
(c) means for connecting said vanes with said shaft for movement around the axis of said shaft upon rotation of the latter, and for radial oscillatory movement relative to the axis of said shaft during said rotation;
(d) means respectively on said vanes and on said end walls for holding said outer edges of said vanes in slidable engagement with said inner cylindrical surface of said stator, independently of the influence of centrifugal force, upon said rotation of said shaft and revolution of said vanes about the axis of said shaft;
(e) said means connecting said vanes with said shaft including a radially slotted member rigid on said shaft extending outwardly therefrom and receiving each of said vanes, and mounting means on said member at opposite sides of each of said vanes in engagement with and supporting said vanes for said radial movement thereof during said rotation of said shaft;
(f) said mounting means including spaced mounting guide members made of self-lubricating material re- ceived in said slots of said radially slotted member and adapted to receive said vanes in the space defined therebetween in low friction sliding engagement.

5. A rotary pump comprising:
(a) a stator having a wall with a substantially cylindrical inner surface and opposed end walls closing the ends of said stator;
(b) a rotor within said stator including a central shaft rotatably supported on said end walls in a position eccentrically disposed relative to said cylindrical inner surface, and a plurality of blade-like vanes having end edges substantially in engagement with the opposedly facing surfaces of said end walls and having outer edges substantially in engagement with the cylindrical inner surface of said stator;
(c) means for connecting said vanes with said shaft for movement around the axis of said shaft upon rotation of the latter, and for radial oscillatory movement relative to the axis of said shaft during said rotation;
(d) means respectively on said vanes and on said end walls for holding said outer edges of said vanes in slidable engagement with said inner cylindrical surface of said stator, independently of the influence of centrifugal force, upon said rotation of said shaft and revolution of said vanes about the axis of said shaft;
(e) said last mentioned means comprising followers respectively on the opposite ends of each vane, and a pair of corresponding endless cam tracks respectively in said end walls having follower engaging and follower guiding surfaces restricting the movement of said followers and the vanes carrying said followers to path in which said outer edges of said vanes are in said sliding engagement with said inner cylindrical surface during full revolutionary movement of said vanes about the axis of said shaft, and holding said vanes against outward movement of their outer edges into engagement with said cylindrical inner surface under the influence of centrifugal force;
(f) said vanes including seals along the outer and end edges of said vanes adapted to said inner cylindrical surface and said end walls;
(g) said followers are in the form of wedge shaped shoes having inner and outer arcuate surfaces adapted to substantially conform to the contour of said follower engaging and follower guiding surfaces of said cam tracks.

6. A rotary pump comprising:
(a) a stator having a wall with a substantially cylindrical inner surface and opposed end walls closing the ends of said stator;
(b) a rotor within said stator including a central shaft rotatably supported on said end walls in a position eccentrically disposed relative to said cylindrical inner surface, and a plurality of blade-like vanes having end edges substantially in engagement with the opposedly facing surfaces of said end walls and having outer edges substantially in engagement with the cylindrical inner surface of said stator;
(c) means for connecting said vanes with said shaft for movement around the axis of said shaft upon rotation of the latter, and for radial oscillatory movement relative to the axis of said shaft during said rotation;
(d) means respectively on said vanes and on said end walls for holding said outer edges of said vanes in slidable engagement with said inner cylindrical surface of said stator, independently of the influence of centrifugal force, upon said rotation of said shaft and revolution of said vanes about the axis of said shaft;
(e) said means on said end walls for holding said outer edges of said vanes in slidable engagement with said inner surface of said stator includes a pair of corresponding substantially elliptical cam tracks adapted to receive therein followers on the opposite ends of each of said vanes, the long axis of said elliptical tracks being in a plane which passes through the axis of said rotor perpendicularly intersecting a plane passing through the axes of said rotor and said cylindrical inner surface.

References Cited

UNITED STATES PATENTS

| | | | |
|---|---|---|---|
| 115,254 | 5/1871 | Tenant. | |
| 732,671 | 6/1903 | Andrews. | |
| 1,444,269 | 2/1923 | Piatt | 103—136 |
| 2,330,565 | 9/1943 | Eckart | 103—136 X |
| 2,460,251 | 1/1949 | Diaz | 103—136 X |
| 2,555,678 | 6/1951 | Cornwell | 103—136 |
| 2,642,148 | 6/1953 | Grise | 103—136 X |
| 2,754,766 | 7/1956 | Feroy. | |
| 3,327,638 | 6/1967 | Scognamillo | 103—136 |
| 3,331,326 | 7/1967 | Casey | 103—161 X |

DONLEY J. STOCKING, Primary Examiner

WARREN J. KRAUSS, Assistant Examiner

U.S. Cl. X.R.
103—144; 230—157